United States Patent
Weldy et al.

[11] Patent Number: 6,053,558
[45] Date of Patent: Apr. 25, 2000

[54] COVER ASSEMBLY FOR THE CARGO AREA OF A VEHICLE

[75] Inventors: Ross Weldy, Elkhart, Ind.; Jack G. Barben, Union, Mich.

[73] Assignee: Penda Corporation, Portage, Wis.

[21] Appl. No.: 08/942,338

[22] Filed: Oct. 1, 1997

[51] Int. Cl.⁷ ....................................................... B60P 7/02
[52] U.S. Cl. ................ 296/100.17; 296/100.15; 296/100.18; 160/374.1; 160/377; 160/381; 160/382
[58] Field of Search ................. 160/328, 368.1, 160/382, 392, 395, 374.1, 377, 381; 135/88.1, 88.16, 121, 907; 52/222; 296/100.1, 100.15, 100.16, 100.17, 100.18; 403/104, 106, 107, 231

[56] References Cited

U.S. PATENT DOCUMENTS

| | | | |
|---|---|---|---|
| 1,796,771 | 3/1931 | Symons | 403/231 |
| 2,562,300 | 7/1951 | Dingman . | |
| 2,687,912 | 8/1954 | Beauchamp | 403/106 |
| 2,771,319 | 11/1956 | Renquist . | |
| 2,978,769 | 4/1961 | Harrah . | |
| 3,122,394 | 2/1964 | Brydon . | |
| 3,151,908 | 10/1964 | Horst . | |
| 3,172,419 | 3/1965 | Lewis . | |
| 3,186,129 | 6/1965 | Blood . | |
| 3,222,103 | 12/1965 | Wernig et al. . | |
| 3,223,446 | 12/1965 | Coppock et al. . | |
| 3,330,225 | 7/1967 | Barry . | |
| 3,347,575 | 10/1967 | Morris | 403/107 |
| 3,373,464 | 3/1968 | Ausnit . | |
| 3,380,507 | 4/1968 | Bontrager . | |
| 3,421,276 | 1/1969 | LaBarge . | |
| 3,774,959 | 11/1973 | Brudy . | |
| 3,866,380 | 2/1975 | Benson | 52/656 |
| 3,871,039 | 3/1975 | Garceau et al. | 5/181 |
| 3,950,869 | 4/1976 | Samarin | 38/102.91 |
| 3,987,835 | 10/1976 | Bloomfield . | |
| 4,036,521 | 7/1977 | Clenet . | |
| 4,083,157 | 4/1978 | Anthonioz . | |
| 4,103,401 | 8/1978 | Conley . | |
| 4,273,377 | 6/1981 | Alexander . | |
| 4,303,289 | 12/1981 | Hardy | 312/330 R |
| 4,399,640 | 8/1983 | Porter . | |
| 4,403,642 | 9/1983 | Morris . | |
| 4,479,677 | 10/1984 | Gulette et al. . | |
| 4,552,406 | 11/1985 | Ohl . | |
| 4,639,033 | 1/1987 | Wheatley et al. . | |
| 4,682,366 | 7/1987 | Ausnit et al. . | |
| 4,730,866 | 3/1988 | Nett . | |

(List continued on next page.)

OTHER PUBLICATIONS

Parts Listing, back luggage compartment, interior trim; 1983 F (Mustang).

1984 Ford Car Shop Manual; Mark VII, Continental, Thunderbird/Cougar,LTD/Marquis, Mustang/Capri.

Advertisement for Luxxus TruxCover; 1989.

Custom Cover Advertisement; "The Tonneau Cover of the Future".

Pick–Up Pleaser Covers Advertisement; Innovative Accessories Incorporated.

Tuff Tonno Advertisement; Extang Corporation.

Sport Masters Care Instructions for Tonneau Cover.

Sport Masters Frame Mounted Vinyl Tonneau Covers Product Feature Sheet, Application Chart, etc.

Aluminum Frame Tonneau Cover Assembly Instructions; K Bon.

*Primary Examiner*—Russell D. Stormer
*Assistant Examiner*—Paul Chenevert
*Attorney, Agent, or Firm*—Harness, Dickey & Pierce, PLC

[57] ABSTRACT

A cover assembly for the cargo area of a vehicle includes a plurality of rails which can be attached to the walls of a truck bed and a cover having an edge which is engageable by the rails. The rails are connected together by corner members. The corner members include a locking structure which is inserted into a channel in the rails. The locking mechanism of the corner members engages slots in the rails and secures the rails together. The rails include different structures which engage fasteners on the edges of the cover.

10 Claims, 6 Drawing Sheets

6,053,558

U.S. PATENT DOCUMENTS

| | | |
|---|---|---|
| 4,769,877 | 9/1988 | Conley . |
| 4,792,179 | 12/1988 | Stevens . |
| 4,799,299 | 1/1989 | Campbell . |
| 4,807,921 | 2/1989 | Champie, III et al. . |
| 4,838,602 | 6/1989 | Nett . |
| 4,861,092 | 8/1989 | Bogard . |
| 4,877,283 | 10/1989 | Little . |
| 4,923,240 | 5/1990 | Swanson . |
| 4,953,820 | 9/1990 | Yoder ................................... 248/231.5 |
| 5,058,652 | 10/1991 | Wheatley et al. . |
| 5,076,338 | 12/1991 | Schmeichet et al. . |
| 5,121,960 | 6/1992 | Wheatley . |
| 5,152,574 | 10/1992 | Tucker . |
| 5,275,458 | 1/1994 | Barben et al. . |
| 5,460,423 | 10/1995 | Kerting et al. . |
| 5,540,475 | 7/1996 | Kersting et al. . |
| 5,553,652 | 9/1996 | Rushford ................................ 160/354 |
| 5,647,682 | 7/1997 | Riehm .................................... 403/231 |
| 5,722,477 | 3/1998 | Richter et al. .......................... 160/135 |
| 5,758,922 | 6/1998 | Wheatley ................................ 296/100 |

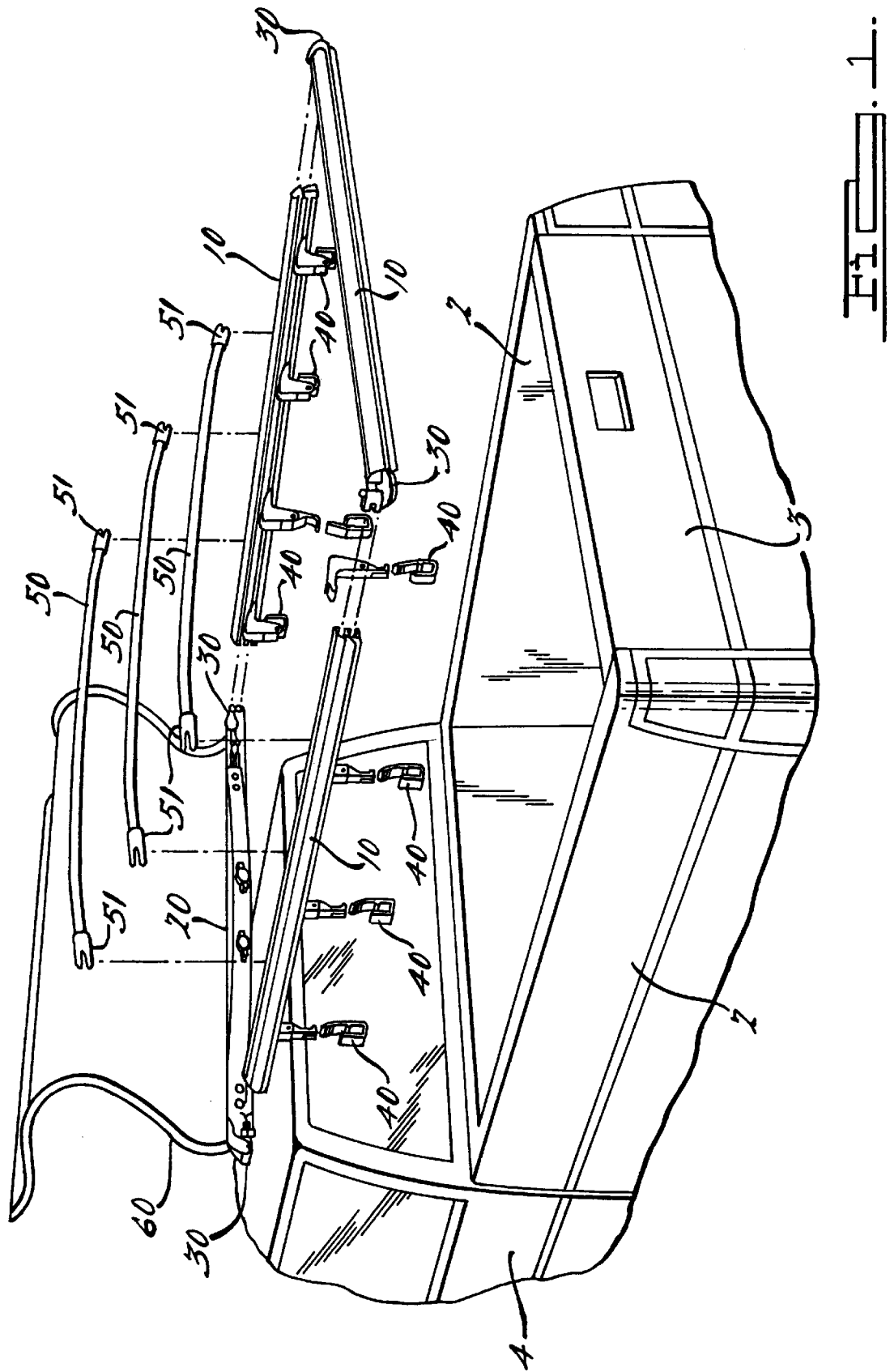

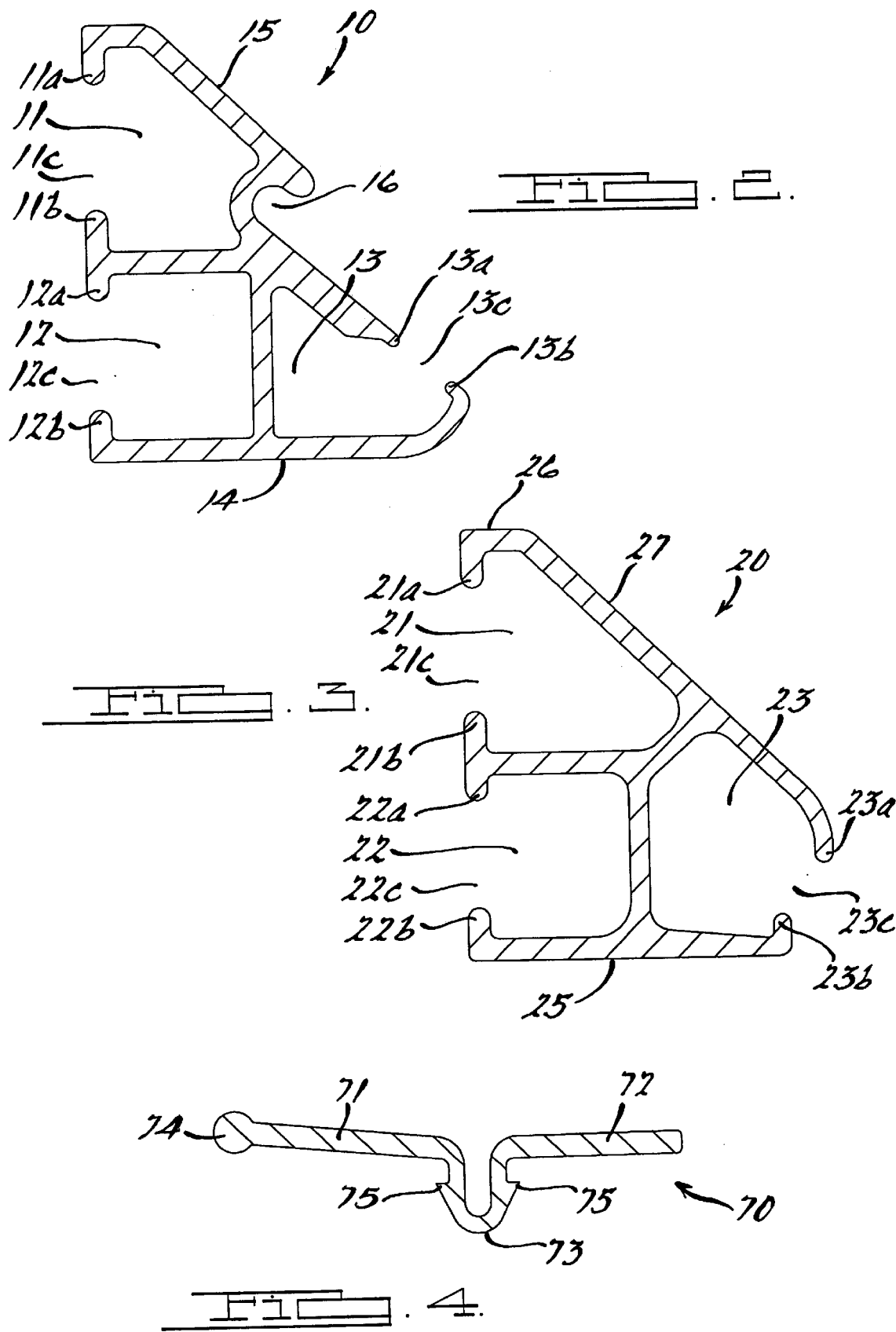

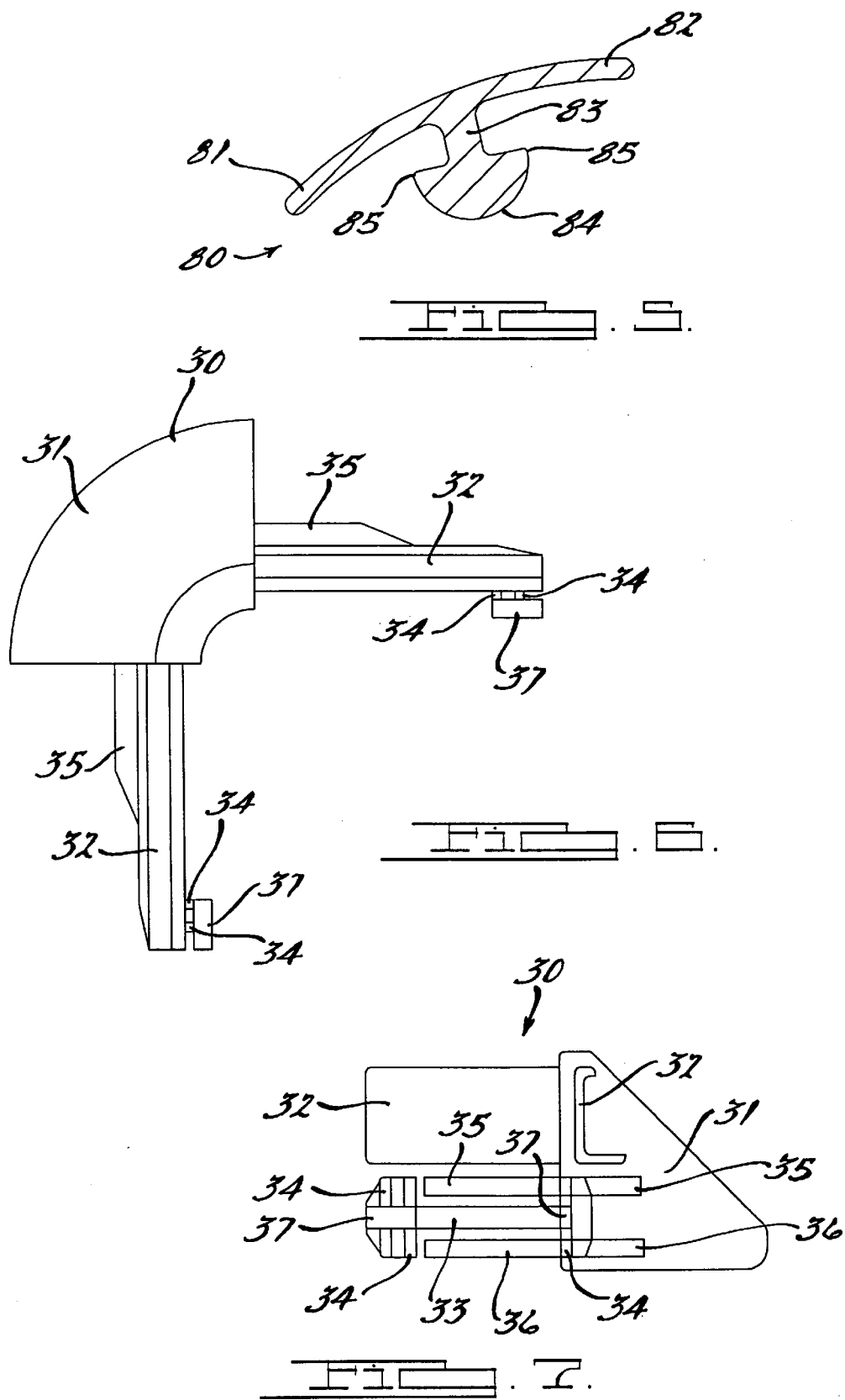

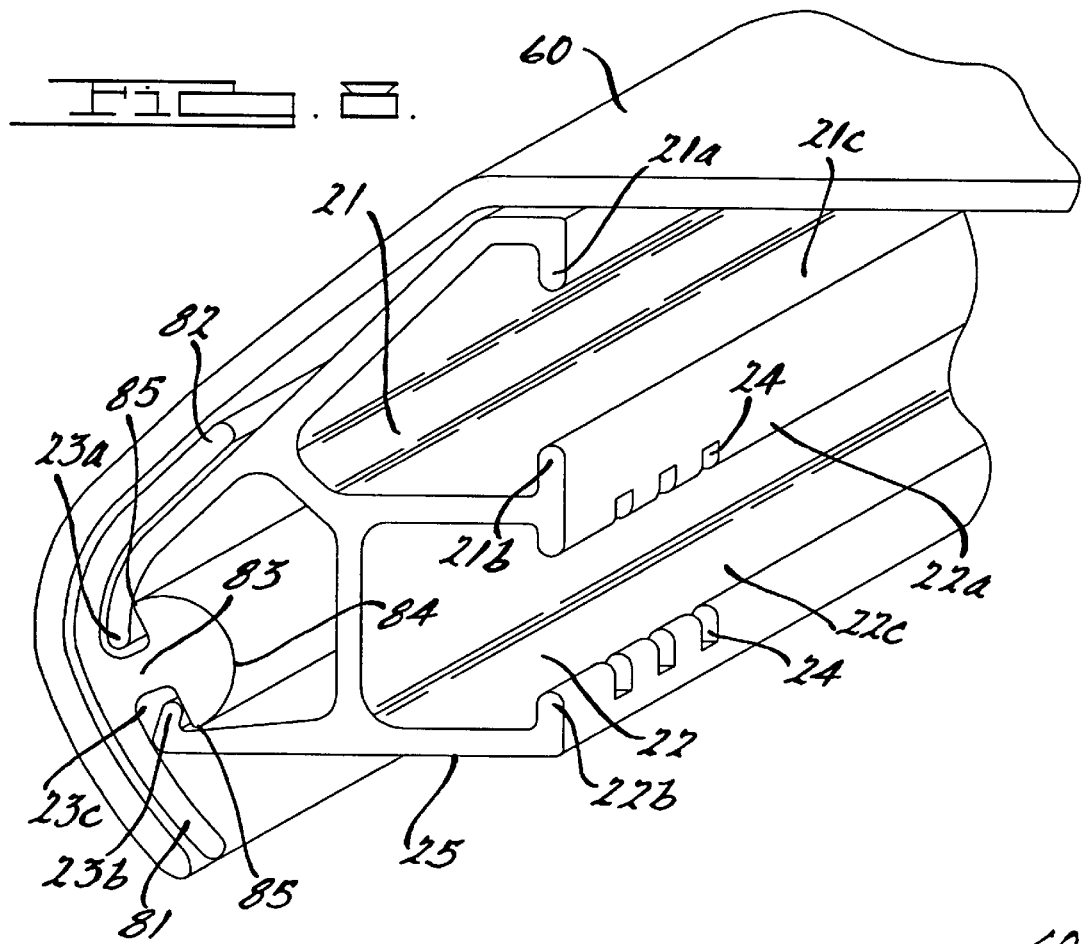
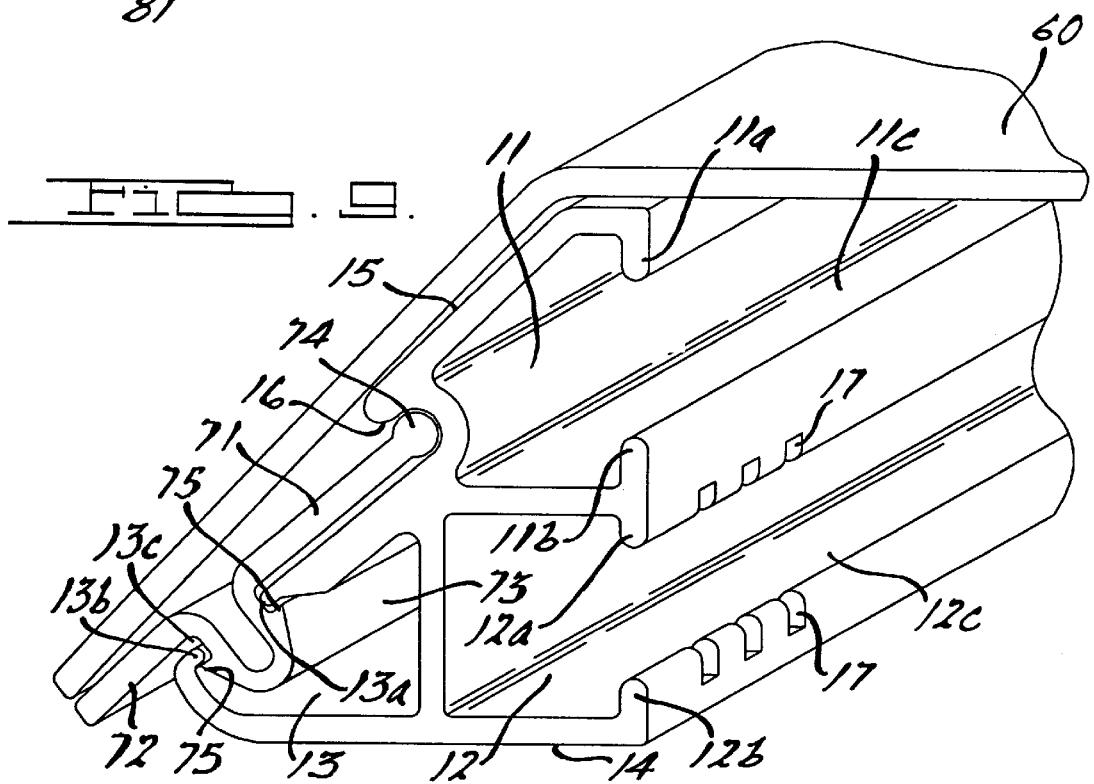

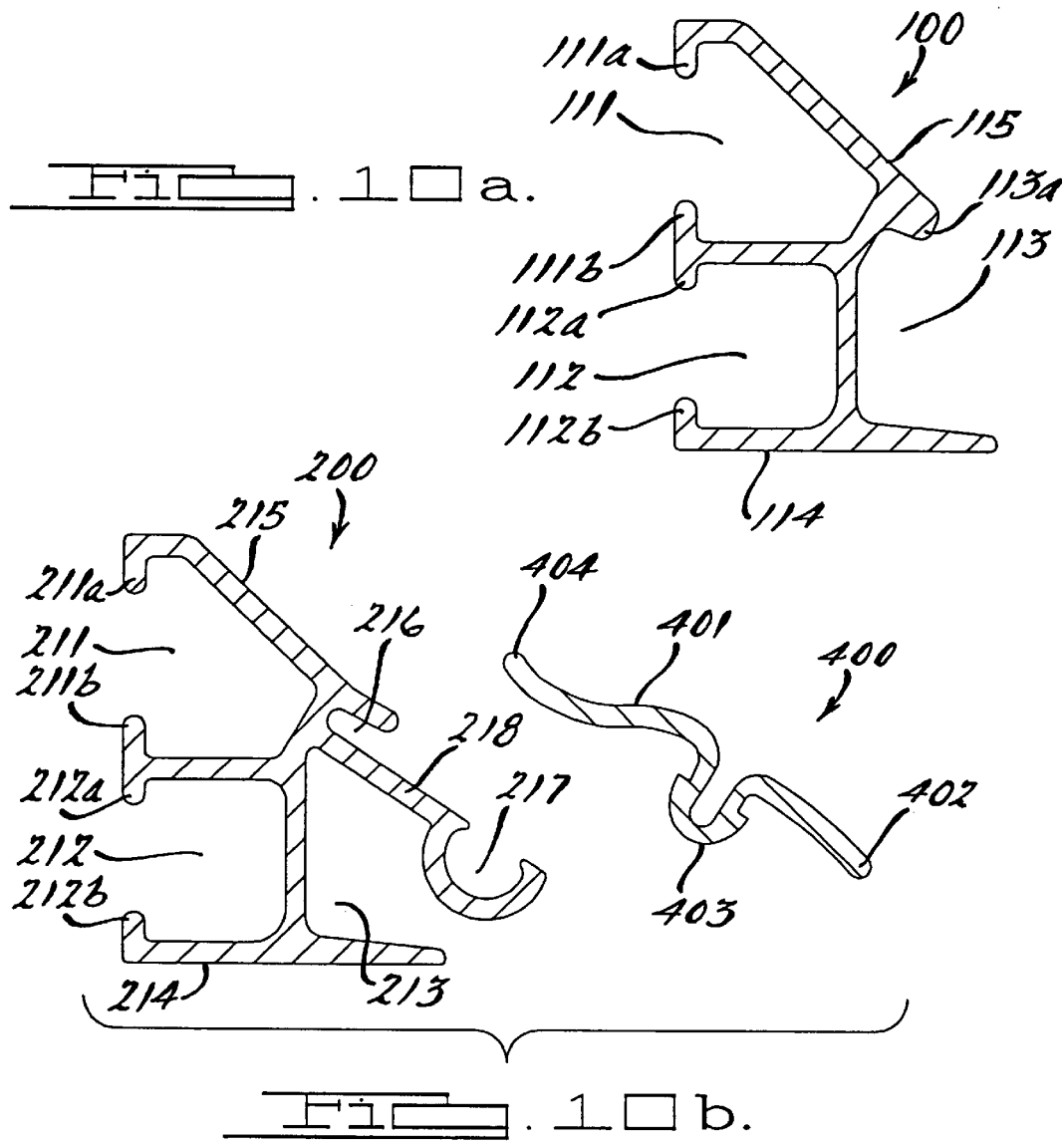
FIG. 10a.
FIG. 10b.
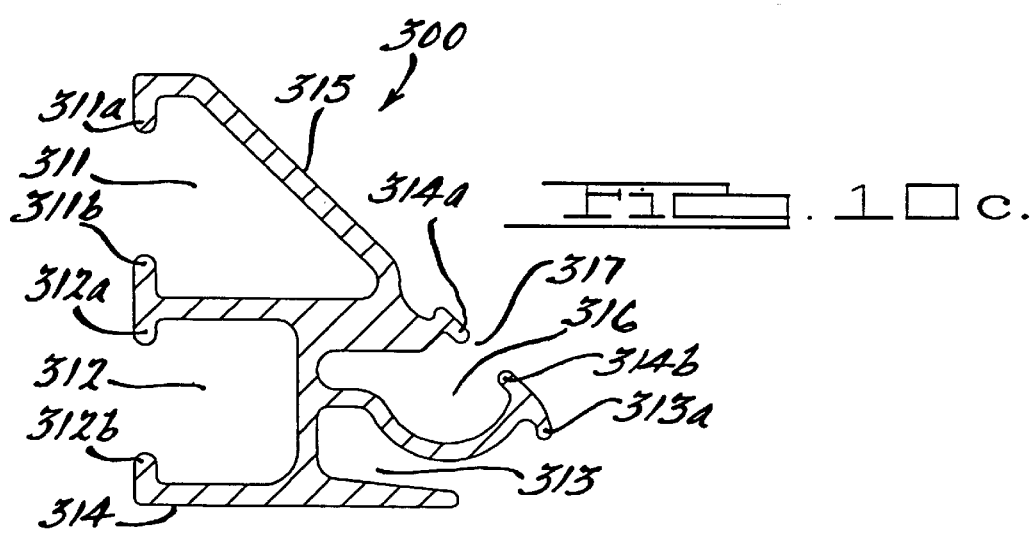
FIG. 10c.

COVER ASSEMBLY FOR THE CARGO AREA OF A VEHICLE

BACKGROUND AND SUMMARY OF THE INVENTION

The present invention relates a cover assembly for the cargo area of a vehicle.

Tonneau covers are frequently mounted over truck beds, e.g. pickup truck beds, to protect contents therein from sun light and inclement weather, to conceal contents therein from view, and to protect the beds from accumulating snow and rain. Such covers also decrease fuel consumption at high speeds by reducing wind resistance and drag.

Truck bed covers are often attached to the top rails of truck beds by mechanical fasteners, and are preferably designed so that they can be easily opened or removed to gain access to the truck bed. Prior to modern day truck covers, canvas covers were often secured over the beds of trucks using rope or elastic straps.

Modern truck covers are removably secured to the side walls of truck beds utilizing a variety of mechanical fasteners, including rail systems which engage the covers. For example, U.S. Pat. Nos. 4,730,866 and 4,838,602 to Nett disclose a tonneau cover which includes extruded metallic rails having snap fasteners that secure the cover at the sides and rear of the truck bed. A dowel rod is inserted into a loop formed in the cover which loop is inserted into a channel in the front rail section.

U.S. Pat. No. 4,792,179 to Stevens discloses a tonneau cover attaching system which includes rails that provide a gap at the top of the side walls of a truck bed. The gap secures a cover by engaging a plastic strip which is sewn along the edge of the cover.

U.S. Pat. No. 4,923,240 to Swanson discloses a cover for a truck bed which includes a rail that engages an engaging structure attached to the cover.

The present invention provides a cover assembly for the cargo area of a vehicle including a plurality of rails, at least one transverse slot formed in the rails, a plurality of corner members and at least one projection connected to a corner member and configured to engage one of the transverse slots and a cover. The projection may be an integral part of the corner member and may be deflectable. The projection may be attached to a deflectable arm extending from the corner member. The corner member may include a tab for deflecting the projection.

In one embodiment of the invention, the rails include at least one channel, at least one lip adjacent the channel and the transverse slots are provided in the lip.

In another embodiment, the number of transverse slots on a rail is equal to or greater than the number of projections on a corner member.

In another embodiment, each rail includes a channel and a fastener is attached to the cover and configured to engage the channel. The rail may include a lip and the fastener may be configured to engage the lip.

In another embodiment, the rail includes a channel and a groove. A fastener secured to the cover is receivable in the groove for pivotal movement to effect pulling of the cover as the fastener is pivoted. A portion of the fastener may be configured to engage the channel.

In another embodiment of the present invention, a cover assembly for the cargo area of a vehicle includes at least one rail, a cover, a groove formed on the rail and a fastener attached to the cover and configured to engage the groove. In one embodiment, the fastener is pivotally attachable to the rail to apply, while pivoting, a tightening force to the cover. The fastener may include a projection and the rail may include a channel which receives the projection.

According to another embodiment of the present invention, a cover assembly for the cargo area of a vehicle includes at least one rail, a cover, a fastener attached to the cover, a transverse slot formed on the rail and a locking lever configured to engage the fastener and the longitudinal slot. The locking lever may pivot within the slot to apply, while pivoting, a tightening force to the cover. The rail may include a channel which receives the locking lever. The locking lever may include a stepped edge that engages an abutment formed on the rail.

Other features of the present invention will now become apparent to those skilled in the art from considering the accompanying drawings and detailed description of the preferred embodiments.

BRIEF DESCRIPTION OF DRAWINGS

FIG. 1 is an exploded view of a cover assembly for the cargo area of a vehicle according to the present invention.

FIG. 2 is a cross-sectional view of a first rail according to one embodiment of the present invention.

FIG. 3 is a cross-sectional view of a second rail section according to one embodiment of the present invention.

FIG. 4 is a cross-sectional view of a fastener for securing a cover to the first rail according to one embodiment of the present invention.

FIG. 5 is a cross-sectional view of a fastener for securing the second cover to a rail according to one embodiment of the present invention.

FIG. 6 is a top plan view of a corner member according to one embodiment of the present invention.

FIG. 7 is an end view of the corner member shown in FIG. 6.

FIG. 8 is a perspective end view showing the fastener of FIG. 5 securing a cover to the second rail of FIG. 3.

FIG. 9 is a perspective end view showing the fastener of FIG. 4 securing a cover to the first rail of FIG. 2.

FIGS. 10a–10c are cross-sectional views of rail sections according to different embodiments of the present invention.

DETAILED DESCRIPTION OF THE PREFERRED EMBODIMENTS

Figure 11A:
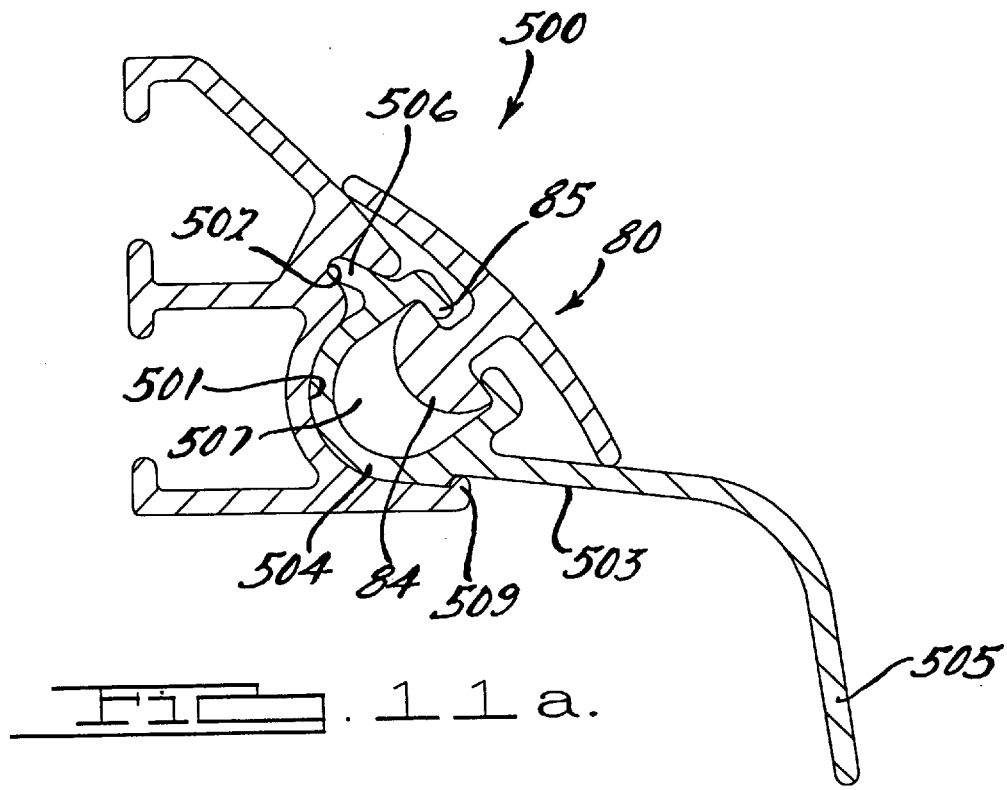
FIG. 11a is a cross-sectional view of a rail and a locking lever for securing a cover thereto.

FIG. 1 is an exploded view of a cover assembly for the cargo area of a vehicle according to the present invention. The cover system generally includes first rails 10, second rail 20, corner members 30, fasteners 40, bows 50 and cover 60. Rails 10 and 20 are attached to the top rails of front wall 1, side walls 2, and rear wall or gate 3 of truck 4 by fasteners 40, which are depicted in FIG. 1 as being cam lever clamps. Other types of fasteners could be used to attach the first and second rails of the present invention to the walls of the truck bed, including spring biased clamps, threaded fasteners, or the like.

FIG. 2 is a cross-sectional view of a first rail 10. As shown in FIG. 2, first rail 10 includes first and second inner channels 11 and 12 and a third outer channel 13. The inner channels 11 and 12 face toward the center of the truck bed when first rail 10 is attached to a wall of the truck. Lips 11a and 11b border inner channel 11 and define a longitudinal slot 11c. Similarly, lips 12a and 12b are adjacent channel 12 and define a longitudinal slot 12c. The outer channel 13 also includes lips 13a and 13b adjacent longitudinal slot 13c. Protruding lips 11a, b, 12a, b, and 13a, b engage a fastener which is provided on the periphery of the cover 60 to thereby secure the cover 60 to first rail 10 when the cover is closed, as described below. It is to be understood that the protruding lips 13a and 13b do not have to have the exact shapes shown in FIG. 2. They can be of a different shape as long as they are capable of engaging a fastener and securing cover 60 to the truck bed. The cross-sectional shape of channels 11 and 12 depicted in FIG. 2 can be varied as long as they accommodate corner members 30 and bows 50, as described below.

First rail 10 further includes a base 14 and an outer angled surface 15. A groove 16 is formed above channel 13, adjacent channel 11 and beneath the lower end of outer surface 15. Groove 16 receives a fastener for securing cover 60 to first rail 10, as described below. There are a plurality of transverse slots 17 formed in lips 12a and 12b (FIG. 9). In one embodiment, two or more equally spaced apart transverse slots 17 are formed in lips 12a and 12b. As will be described below, transverse slots 17 allow for adjustably positioning the connection between corner members 30 and the rails.

FIG. 3 is a cross-sectional view of second rail 20 Second rail 20 includes a first inner channel 21, a second inner channel 22 and a third outer channel 23. First channel 21 is bordered by lips 21a and 21b, which define a longitudinal slot 21c. Similarly, channel 22 is bordered by lips 22a and 22b which define a longitudinal slot 22c and channel 23 is bordered by lips 23a and 23b which define a longitudinal slot 23c. Lips 21a and 21b may be provided with a plurality of transverse slots 24 (FIG. 8). Second rail 20 further includes a base 25, an uppermost surface 26 and an angled outer surface 27. First rail 10 and second rail 20 are preferably made of extruded aluminum, but other materials may also be used.

FIG. 4 is a cross-sectional view of a fastener for securing cover 60 to first rails 10. Fastener 70 generally includes a first arm 71 and a second arm 72 joined by a U-shaped projection 73. First arm 71 includes an enlarged end 74 in the form of a bead. U-shaped projection 73 includes a pair of barbs 75 extending therefrom. Fastener 70 is secured to cover 60 along the periphery on three sides. Fastener 70 may be made from a rigid or flexible material.

FIG. 5 is a cross-sectional view of a fastener 80 used to secure cover 60 to second rail 20. Fastener 80 generally includes a first arm 81 and a second arm 82 with a depending U-shaped projection 83 terminating in a bead 84. Bead 84 is configured so as to extend laterally beyond U-shaped projection 83 and form two ears or ledges 85. The bead 84 can either be resilient or rigid. Fastener 80 is secured to cover 60 along the periphery of one side.

FIGS. 6 and 7 are top views of a corner member 30 having a locking mechanism which cooperates with first and second rails 10 and 20. Corner member 30 includes a body portion 31, upper arms 32 and lower, deflectable arms 33 which are configured to be received into the inner channels 11, 12, 21 and 22 of first and second rails 10 and 20. Lower arms 33 include a locking mechanism which cooperates with the transverse slots 17 and 24 formed in lips 12a, 12b, 21a and 21b of rails 10 and 20. The locking mechanism includes a pair of parallel, rectangular projections 34 formed on lower arm 33. The rectangular projections 34 are dimensioned and spaced apart so as to be received in adjacent pairs of the transverse slots 17 or 24, as described below. Corner members 30 further include a pair of rigid guide arms 35 and 36 disposed above and below lower arms 33. Each lower arm 33 also includes a tab or projection 37 formed thereon.

To assemble the cover of the present invention, cover 60 is positioned adjacent second rail 20 such that bead 84 on fastener 80 is located adjacent channel 23. Bead 84 is then slid along channel 23 such that U-shaped projection 83 is located within longitudinal slot 23c. In this manner, ledges or ears 85 are located behind lips 23a and 23b and prevent fastener 80 from disengaging channel 23. Alternatively, if bead 84 is compressible, it may be pressed into channel 23 through longitudinal slot 23c. Corner members 30 are secured to each end of second rail 20 by inserting upper arms 32 and lower arms 33 into channels 21 and 22. As arms 32 and 33 are inserted, projections 34 ride in channel 22 behind lips 22a and 22b until projections 34 align with transverse slots 24, at which time they snap into position in the transverse slots 24. This prevents corner members 30 from disengaging the second rails 20. In this manner, body 31 closes off channel 23 and prevents fastener 80 from sliding out of channel 23.

Two first rails 10 are then joined to second rail 20 by inserting upper arms 32 and lower arms 33 into channels 11 and 12 until they are locked into place in a similar manner. Likewise, another first rail 10 is secured to the previous first rails 10 with corner pieces 30.

Note that by providing a plurality of transverse slots 17 and 24, the size of the cover frame formed by rails 10 and 20 can be varied by inserting arms 32 and 33 in a desired location in channels 11, 12, 21 and 22. Tab 37 is provided in order to more easily deflect arm 33. Tab 37 is sized so as to be slidable through longitudinal slots 12c and 22c. Once the projections 34 are engaged in a locked position, pushing on tab 37 will deflect arm 33 and disengage rectangular projections 34 from the transverse slots 17, 24 so that the corner member 30 and rail section 10, 20 can be disconnected or adjusted so that the rectangular projections 34 engage another pair of transverse slots 17, 24.

From the above description, it can be understood that the transverse slots 17 and 24 could be provided in either the upper or lower inner channels 11, 12, 21 and/or 22 of the first and second rails 10, 20, with a deflectable arm and projections located accordingly on the corner members. It can also be understood that one or more projections on a corner member and a like number of transverse slots 17 and 24 on a first and second rail section 10, 20 could be used. FIGS. 6–9 depict the use of two rectangular locking projections 34 and three rectangular transverse slots 17 and 24 which receive the rectangular locking projections 34. In alternative embodiments, one or more projections on the corner members having other than rectangular shapes could be used together with an equal or greater number of complementarily shaped transverse slots formed in the first and second rail sections 10, 20.

First and second rails 10 and 20 are then secured to the truck bed by fasteners 40. Any number of fasteners, such as clamps, can be used. Typically, a portion of the clamp is inserted underneath the top rail of the truck bed and another portion is inserted in either channel 12 or channel 22 of first and second rails 10 and 20. Camming levers are then rotated to clamp the rails 10, 20 to the truck bed. Bows 50 are then secured to the first rails 10 by inserting end clips 51 into channels 11, 12, 21 or 22, depending upon the end clip used. Various configurations for the end clips 51 can be used, so long as they mate properly with channels 11, 12, 21 and/or 22.

To close cover 60, the cover is positioned such that fasteners 70 are adjacent first rails 10. To secure fasteners 70 to first rails 10, bead 74 is positioned within groove 16 at one end of first rail 10. U-shaped projection 73 is then inserted through longitudinal slot 13c into channel 13 such that ears 75 are located behind lips 13a and 13b. The user then presses U-shaped projection 73 into channel 13 along the entire length of first rail 10. As U-shaped projection 73 is pressed into channel 13, arm 71 pivots about bead 74 in groove 15 and acts as a lever, making it easier to secure fastener 70 to first rail 10. This allows the cover 60 to be cut somewhat smaller than would otherwise be necessary. As a result, fastener 70 causes an inward force to be applied in the direction of outer surface 15 of first rail 10 and keeps cover 60 taut. Note that fastener 70 provides a continuous attachment or latching mechanism for cover 60. Note also that cover 60 may be of a resilient or non-resilient material. When cover 60 is closed, fastener 70 produces a double seal by engagement of bead 74 with groove 16 and the engagement of U-shaped projection 73 with channel 13.

FIGS. 10a–10c are cross-sectional views of rails according to further embodiments of the present invention. In these embodiments, "1", "2" or "3" have been added to the reference numbers of the previous embodiments to show similar features. In each of these embodiments, the shape of the inner channels 111, 112, 211, 212, 311 and 312 of the rails are similar to channels 21 and 22. This similarity in shape enables any combination of the different rail designs to be connected together by similar corner members 30 and the use of similar locking structures.

The rail depicted in FIG. 10b includes a channel 217 formed on a protruding arm 218 located above channel 213. This shape is designed to cooperate with a fastener 400 having a cross-sectional shape as depicted in FIG. 10b. As with fastener 70, the fastener 400 comprises a rigid or a semi-rigid strip which is attached to the edge of the cover 60 and designed to secure the edge of the cover 60 to the rail section. The fastener 400 includes first arm 401 and a second arm 402 joined by projection 403. Projection 403 is complementarily shaped so as to be received in channel 217. First arm 401 terminates in a straight end portion 404. In use, the straight end portion 404 of the fastener 400 is inserted in groove 216 and the projection 403 is "snapped" into channel 217, thereby securing the fastener 400 and the attached cover (not shown) to the rail section. Thus, fastener 400 and rail 200 function in a manner similar to fastener 70 and first rail 10. As with first rail 10 and fastener 70, by making the fastener 400 from a rigid material such as a metal or a semi-rigid material such as a plastic, the straight end portion 404 can be inserted into groove 216 of the rail section and used to apply a prying force to the cover as the projection 403 is pivoted to engage channel 217, thus making the cover taut.

The rail section design depicted in FIG. 10c includes a channel 316 having a longitudinal slot 317 adjacent thereto. The edge of the cover which is to be secured by the rail section of FIG. 10c is provided with a loop. The loop can be formed by folding the edge of the cover over and sewing the folded-over portion together. The loop is inserted into channel 316 and a dowel is inserted through the loop which is positioned in the channel 316. The dowel has a diameter which is larger than the slot 317. Accordingly, the edge of the cover is permanently attached to the rail section so long as the dowel is in place.

FIG. 11a is a cross-sectional view of a rail section and a locking lever for securing a cover thereto. In FIG. 11a, the locking lever is depicted in its locked or latched position. The rail section 500 includes a U-shaped channel 501 having a slot 502 extending from an upper portion thereof. A locking lever 503 is disposed in channel 501. The locking lever 503 includes a U-shaped end portion 504 and a handle or lever portion 505 which extends from the U-shaped end portion 504. Projection 506 extends from the U-shaped end portion 504 of the locking lever 503. The U-shaped end 504 of locking lever 503 includes a slotted channel 507 which is designed to receive a fastener 80.

Figure 11B:
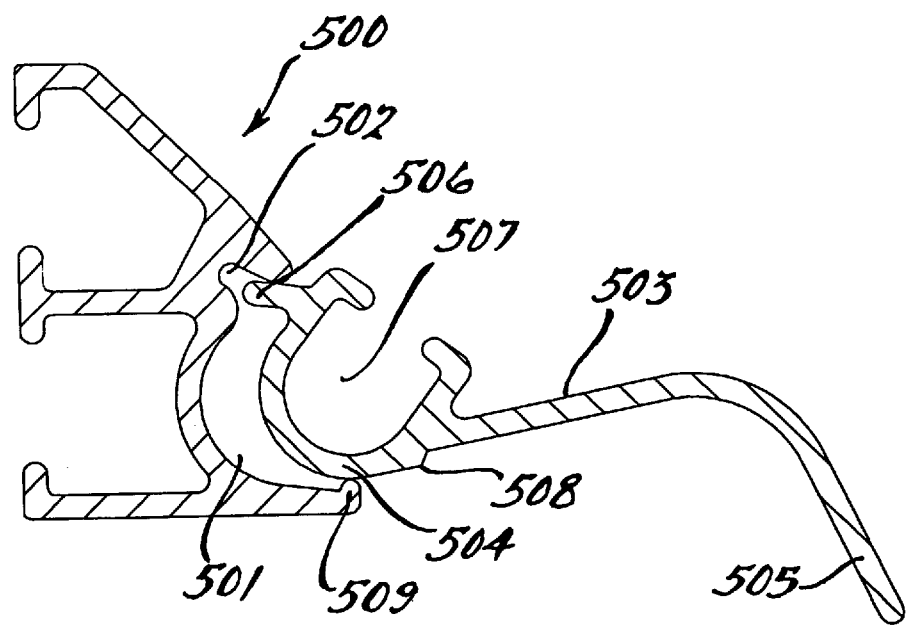
FIG. 11b is a cross-sectional view of the rail section of FIG. 11a which depicts the manner in which the locking lever engages the rail.

FIG. 11b is a cross-sectional view of the rail section of FIG. 11a which depicts the manner in which the locking lever engages the rail section. In use, bead 84 of the fastener 80 (attached to an edge of a cover) is inserted through longitudinal slot 507 on the locking lever 503, as shown in FIG. 11a. Next, the projection 506 of the locking lever 503 is inserted into cavity 502. The lever or handle 505 of the locking lever 503 is then pushed downward in the direction of arrow "a" so that the U-shaped end 504 of the locking lever 503 becomes seated in U-shaped channel 501 in the rail section 500. The locking lever 503 is locked into position when stepped edge 508 on the outer surface of the U-shaped end 504 moves past abutment 509 formed on the lower portion of channel 501. Locking lever 503 is released by pulling up on lever or handle 505.

Although the present invention has been shown and described, the same is to be taken by way of example only and not by way of limitation. Numerous changes can be made to the embodiment shown without departing from the scope of the invention. Accordingly, the scope of the invention is to be limited only by the claims appended hereto.

What is claimed is:

1. A cover assembly for a cargo area of a vehicle, comprising:

a plurality of rails, each of said plurality of rails including a pair of opposing lips defining a longitudinal slot;

said pair of opposing lips including at least one transverse slot formed therein adjacent said longitudinal slot;

a plurality of corner members including a body portion and first and second arms extending from said body portion;

a guide tab extending from each of said first and second arms and configured to be slidably received by said pair of opposing lips within said longitudinal slot; and at least one projection laterally extending from each of said first and second arms and configured to engage the at least one transverse slot.

2. A cover assembly according to claim 1, wherein the at least one projection is an integral part of at least one of the plurality of corner members.

3. A cover assembly according to claim 1, wherein the at least one projection is deflectable.

4. A cover assembly according to claim 3, wherein the first and second arms extending from the plurality of corner members are deflectable.

5. A cover assembly according to claim 3, wherein the guide tab is configured for deflecting the at least one projection.

6. A cover assembly according to claim 1, wherein a number of transverse slots on one end of each of said plurality of rails is equal to or greater than a number of projections on one of said first and second arms of each of the plurality of corner members.

7. A cover assembly according to claim 1, wherein the at least one transverse slot and the at least one projection are rectangular.

8. A cover assembly according to claim 1, wherein each of said plurality of rails includes a channel and further including a fastener attached to a cover and configured to engage the channel.

9. A cover assembly according to claim 1, further including a channel and a groove on at least one of the plurality of rails and a fastener secured to a cover and receivable in the groove for pivotal movement to effect pulling of the cover as the fastener is pivoted.

10. A cover assembly according to claim 9, wherein a portion of the fastener is configured to engage the channel.

* * * * *

UNITED STATES PATENT AND TRADEMARK OFFICE
CERTIFICATE OF CORRECTION

PATENT NO. : 6,053,558
DATED : April 25, 2000
INVENTOR(S) : Ross Weldy et al

It is certified that error appears in the above-identified patent and that said Letters Patent is hereby corrected as shown below:

Col. 2, line 8, "transverse" should be --longitudinal--

Col. 2, line 32, delete "the second cover to a" and insert --a cover to the second--

Col. 3, line 29, insert a period after "rail 20"

Col. 3, line 54, "U-shaped" should be --T-shaped--

Col. 3, line 59, delete "top"

Col. 4, line 11, "U-shaped" should be --T-shaped--

Col. 4, line 66, after "the" insert --first and second--

Col. 5, line 5, after "cover" insert --60--

Signed and Sealed this

Twenty-fourth Day of April, 2001

Attest:

NICHOLAS P. GODICI

Attesting Officer

Acting Director of the United States Patent and Trademark Office